(12) United States Patent
Taylor et al.

(10) Patent No.: US 11,771,993 B2
(45) Date of Patent: Oct. 3, 2023

(54) CHANGING RESPONSE WINDOW FOR INTERACTIVE CONTENT USING USER'S REACTION TIME

(71) Applicant: Sony Interactive Entertainment Inc., Tokyo (JP)

(72) Inventors: Michael Taylor, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/200,682

(22) Filed: Mar. 12, 2021

(65) Prior Publication Data
US 2022/0288492 A1 Sep. 15, 2022

(51) Int. Cl.
| | |
|---|---|
| *A63F 13/60* | (2014.01) |
| *A63F 13/213* | (2014.01) |
| *A63F 13/428* | (2014.01) |
| *G06F 3/01* | (2006.01) |
| *A63F 13/211* | (2014.01) |
| *G02B 27/01* | (2006.01) |

(52) U.S. Cl.
CPC ............ *A63F 13/60* (2014.09); *A63F 13/211* (2014.09); *A63F 13/213* (2014.09); *A63F 13/428* (2014.09); *G02B 27/017* (2013.01); *G06F 3/015* (2013.01)

(58) Field of Classification Search
CPC ...... A63F 13/60; A63F 13/211; A63F 13/213; A63F 13/428
See application file for complete search history.

(56) References Cited

U.S. PATENT DOCUMENTS

| | | | | |
|---|---|---|---|---|
| 2002/0013166 A1* | 1/2002 | Yoshitomi | ............ | G10H 1/0008 463/7 |
| 2007/0066403 A1* | 3/2007 | Conkwright | .......... | A63F 13/803 463/43 |
| 2007/0082729 A1* | 4/2007 | Letovsky | ................ | A63F 13/10 463/23 |
| 2008/0268943 A1* | 10/2008 | Jacob | ...................... | A63F 13/67 463/43 |
| 2009/0186693 A1* | 7/2009 | Panoff | ..................... | A63F 13/52 463/31 |
| 2009/0280903 A1* | 11/2009 | Ikejiri | ................... | A63F 13/573 463/43 |
| 2010/0240458 A1* | 9/2010 | Gaiba | ................... | A63F 13/212 463/36 |
| 2010/0304839 A1* | 12/2010 | Johnson | .................. | A63F 13/67 463/43 |

(Continued)

OTHER PUBLICATIONS

"International Search Report and Written Opinion", May 9, 2022, from counterpart PCT application PCT/US22019781.

*Primary Examiner* — David L Lewis
*Assistant Examiner* — Shauna-Kay Hall
(74) *Attorney, Agent, or Firm* — John L. Rogitz; John M. Rogitz (57) ABSTRACT

Sensors including eye tracking sensors, accelerometers and other motion sensors, and muscle sensors identify the timing gap between a computer game object appearing on the screen, the user shifting his attention to the object, and the user taking action in response to the object. If the user's reaction time falls outside of an expected window but the intent was correct, the game adjusts its outcome to preserve the intended experience.

20 Claims, 4 Drawing Sheets

(56) References Cited

U.S. PATENT DOCUMENTS

| | | | |
|---|---|---|---|
| 2011/0172017 A1* | 7/2011 | Takahashi | A63F 13/06 463/39 |
| 2013/0344940 A1* | 12/2013 | Kurabayashi | A63F 13/47 463/23 |
| 2014/0113719 A1* | 4/2014 | Lee | A63F 13/428 463/31 |
| 2015/0065273 A1* | 3/2015 | Lake | A63B 69/0053 473/422 |
| 2017/0036116 A1* | 2/2017 | Cohen | G09B 5/00 |
| 2019/0099660 A1* | 4/2019 | Nelson | G07F 17/3227 |
| 2019/0384385 A1* | 12/2019 | Idris | G07F 17/3211 |
| 2020/0129855 A1* | 4/2020 | Ambinder | A63F 13/42 |

\* cited by examiner

CHANGING RESPONSE WINDOW FOR INTERACTIVE CONTENT USING USER'S REACTION TIME

FIELD

The present application relates to technically inventive, non-routine solutions that are necessarily rooted in computer technology and that produce concrete technical improvements.

BACKGROUND

As understood herein, in computer games, player decisions have to be determined by the game console via player input (usually pressing a button). As also understood herein, some players may have more difficulty than others manipulating game controllers, diminishing their enjoyment of the game.

SUMMARY

As further understood herein, sensors including eye tracking sensors, accelerometers and other motion sensors, and muscle sensors identify the timing gap between an object appearing on the screen, the user shifting his attention to the object, and the user taking action in response to the object. If the user's reaction time falls outside of an expected window but the intent was correct, the game adjusts its outcome to preserve the intended experience. An example includes identifying and responding to an enemy in a first-person shooter game. To maintain fidelity with the developer's vision of an experience, the response window is dynamically altered, allowing the user more time to choose the appropriate action in response to an in-game event. Damage to a blow may be delayed and invalidated, an enemy hit box expanded, etc.

Accordingly, a device includes at least one computer memory that is not a transitory signal and that in turn includes instructions executable by at least one processor to receive from a sensor at least one indication of attention of a player of a computer simulation. The instructions are executable to identify at least in part a timing gap based at least in part on the indication. Further, the instructions are executable to identify whether an input received from the player is a correct input, and responsive to identifying that the input is correct and based at least in part on the timing gap, change an outcome of the computer simulation from a first outcome to a second outcome.

The sensor may include one or more of a camera, motion sensor, or electromyography (EMG) sensor.

The outcome may be altered at least in part by altering a response window to allow the player more time to choose an action in response to an in-simulation event, or by delaying damage to a simulation character associated with the player, or by invalidating damage to a simulation character associated with the player, or by expanding a hit region around a simulation character from a first region outside of which a hit is not registered to a second region outside of which a hit is not registered, with the second region being larger than the first region and a hit being registered inside the second region. Any combination of the above may be used.

In another aspect, an apparatus includes at least one processor configured with instructions for identifying whether a reaction time of a player of a computer simulation to an event in the computer simulation exceeds a period. The instructions are executable for identifying whether an action of the player is correct, and responsive to identifying that the action of the player is correct, and that the reaction time exceeds the period, altering an outcome of the computer simulation. Further, the instructions are executable for, responsive to identifying that the action of the player is not correct, and that the reaction time exceeds the period, not altering an outcome of the computer simulation. Similarly, the instructions are executable for, responsive to identifying that the action of the player is correct, and that the reaction time does not exceed the period, not altering an outcome of the computer simulation.

In another aspect, a method includes altering an outcome of a computer game responsive to a correct user input and a reaction time delay having a first length, which is relatively long. On the other hand, the method includes not altering an outcome of the computer game responsive to an incorrect user input and a reaction time delay having the first length, and also not altering an outcome of the computer game responsive to a correct user input and a reaction time delay having a second length shorter than the first length.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
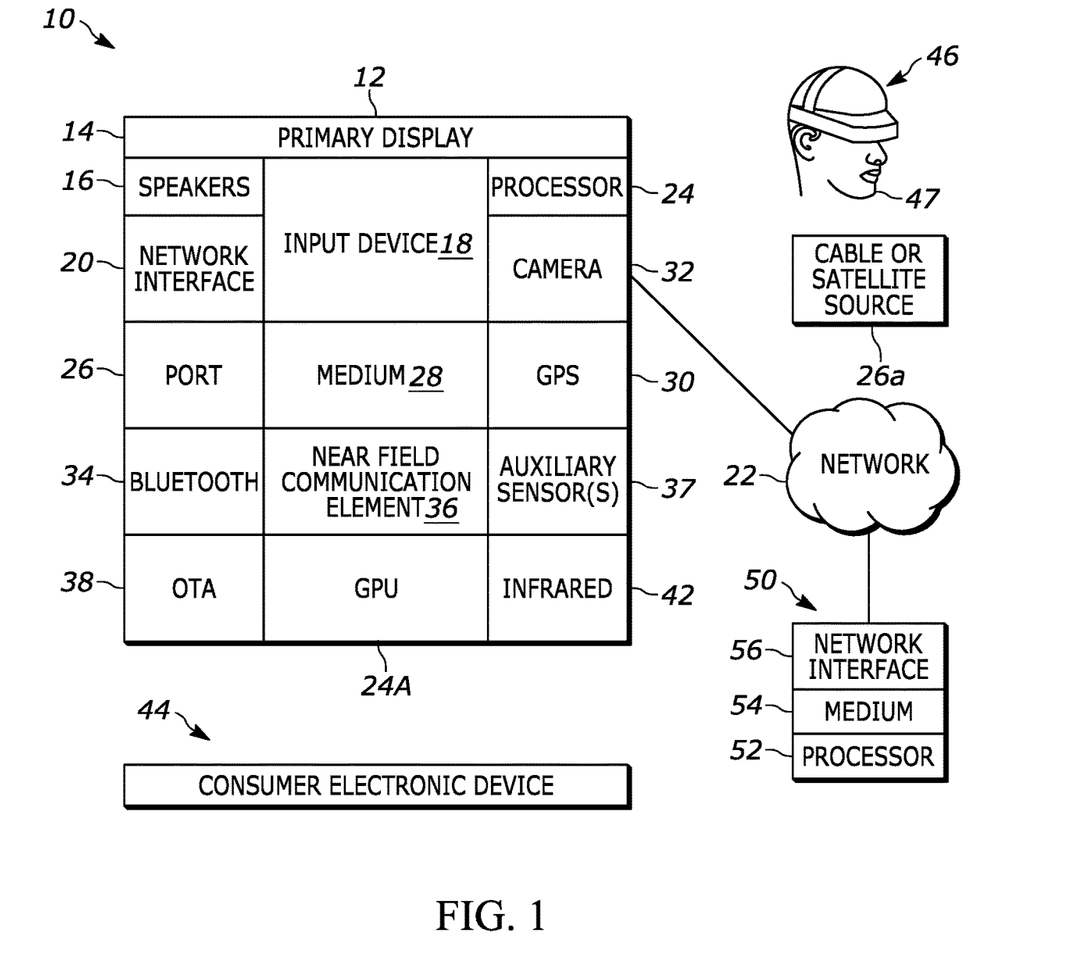
FIG. 1 is a block diagram of an example system including an example in accordance with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a computer game console that can be used to send computer game audio and video to the AVD 12 via commands sent directly to the AVD 12 and/or through the below-described server while a second CE device 46 may include similar components as the first CE device 44. In the example shown, the second CE device 46 may be configured as a computer game controller manipulated by a player or a head-mounted display (HMD) worn by a player 47. In the example shown, only two CE devices 44, 46 are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid-state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm" and may include and perform "cloud" functions such that the devices of the system 10 may access a "cloud" environment via the server 50 in example embodiments for, e.g., network gaming applications. Or the server 50 may be implemented by one or more game consoles or other computers in the same room as the other devices shown in FIG. 1 or nearby.

Figure 2:
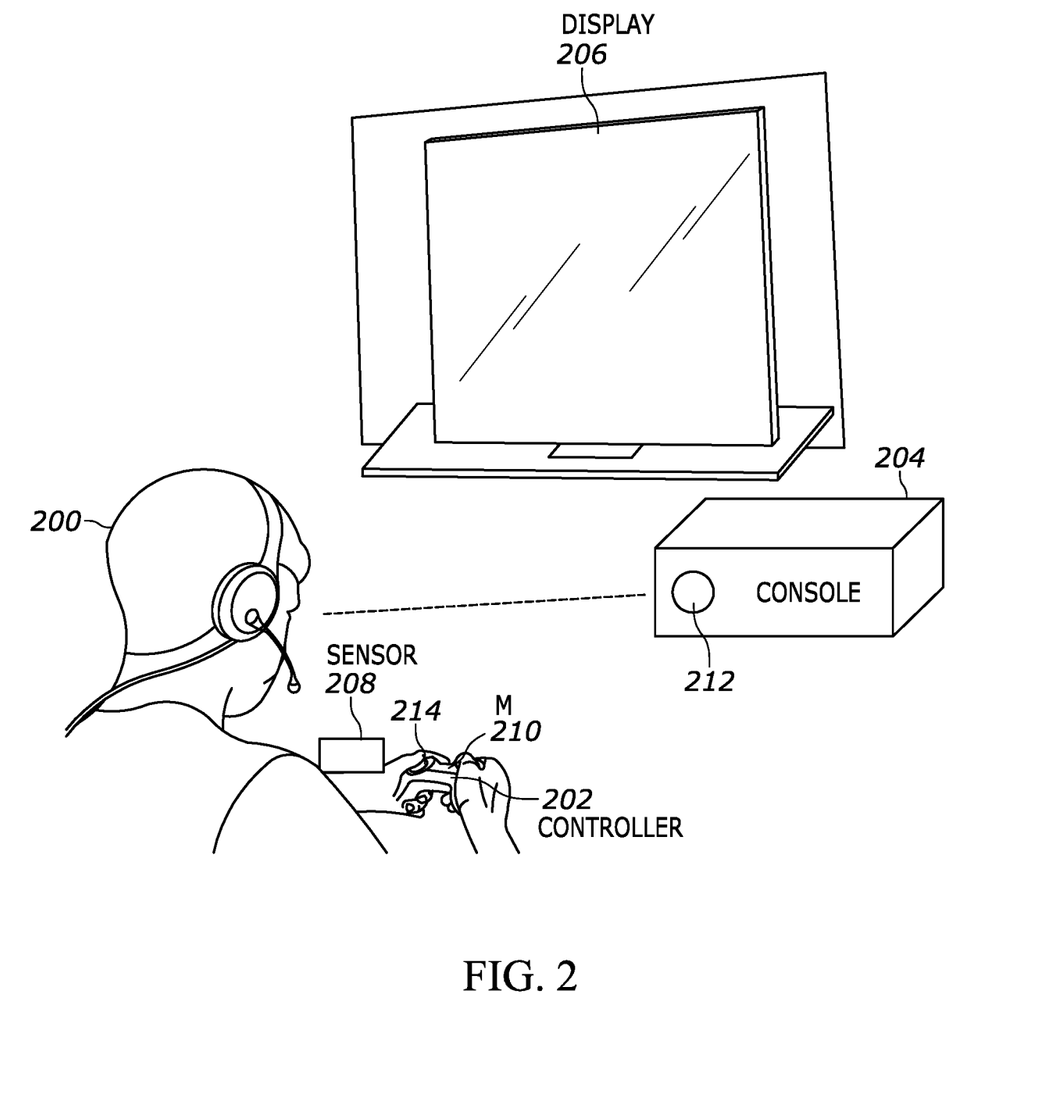
FIG. 2 illustrates an example game system consistent with present principles that may use any or call of the components in FIG. 1.

FIG. 2 illustrates that a player 200 may manipulate a computer simulation controller 202 to control a simulation console 204 for presenting a computer simulation such as a computer game on a display 206. The components shown in FIG. 2 may include some or all components shown in FIG. 1 and may be PlayStation® components.

The system shown in FIG. 2 may include one or more sensors for sensing the attention of the player 200. For example, the system may include one or more muscle sensors 208 such as electromyography (EMG) sensors to sense motion of the player's muscles. The system may include one or more motion sensors 210 such as accelerometers, gyroscopes, and magnetometers to sense motion of the controller 202. The system may include one or more cameras 212 to sense the direction in which the eyes of the player 200 are gazing. The system may include one or more button sensors 214 to sense which controls are pressed on the controller. While the motion sensor 210 is shown on the controller 202, it is to be understood that it may be engaged with any suitable component shown herein, such as a HMD worn by the player 200. While the camera 212 is shown on the console 204, it is to be understood that it may be engaged with any suitable component shown herein, such as a HMD worn by the player 200 or on the display 206.

Images from the camera 212 are sent to one or more processors in any of the devices herein, such as in the console 204, to determine from the camera image the direction of gaze of the player 200 using eye-tracking image recognition to determine what object in the computer game the player is looking at.

In other implementations, in lieu of or in addition to using an image of the player 200, the processor may determine that the player, by means of, e.g., the game controller 202, is hovering a screen cursor over an object in a computer game (preferably without highlighting the hovered-over object). In both cases the signal used by the processor indicates the attention of the player but it not a computer game input signal as would be input by, e.g., the player pressing a key on a game controller.

Similarly, using signals from the motion sensor 210 and/or button sensors 214, the processor may determine the manner and times at which the player 200 is moving and/or manipulating the controller 202. The system may also determine the manner and time of motion of the player 200 using the muscle sensor 208 and/or image recognition of the player 200 using images from the camera 212.

Figure 3:
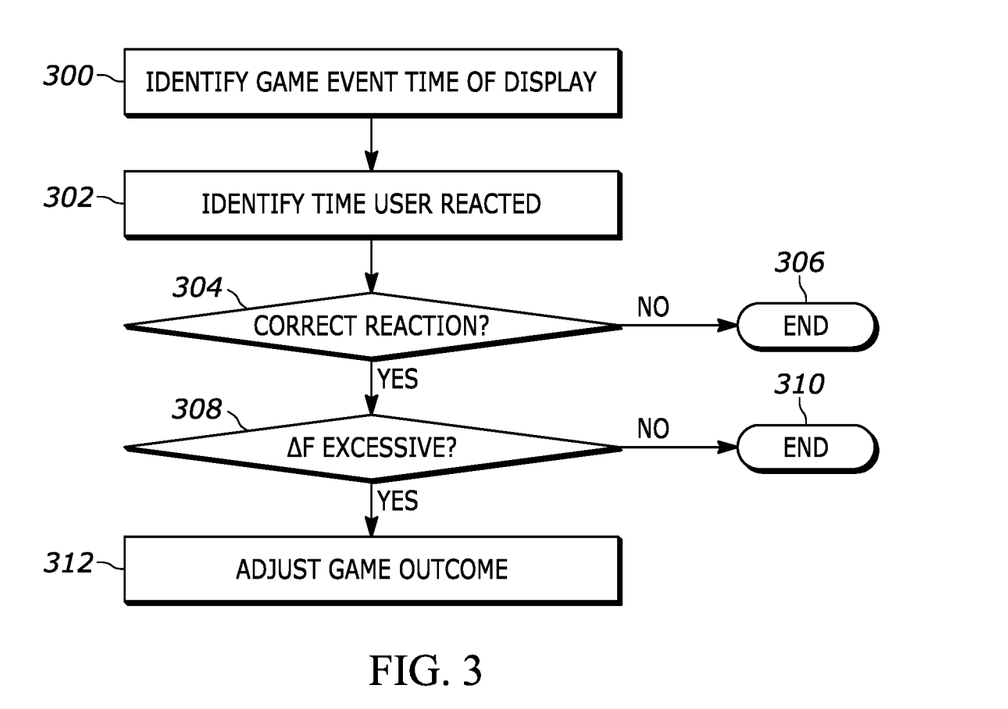
FIG. 3 illustrates example overall logic in example flow chart format.

Refer now to FIG. 3. Commencing at block 300, a game event and its time of display is identified. Typically, the game event requires or implies a response from the player, which is input using the controller 202.

At block 302, the time the player reacted to the game event is identified. The reaction may be identified based on signals from any of the sensors described herein.

Proceeding to decision diamond 304, it is determined whether the player's reaction was correct. "Correctness" is determined in the context of the rules of the game implemented by the game developer and may be indicated in game metadata or elsewhere. For example, if the event at block 300 is the appearance of a monster, the correct reaction from the player may be to cause the player's character in the game to shoot the monster.

If the player failed to take the correct action, the logic may end at state 306 without changing any outcome of the game, e.g., by allowing the monster to destroy the player's character as intended by the game developer. On the other hand, if the player made the correct response, the logic may flow to decision diamond 308.

At decision diamond 308 it is determined whether the period between when the game event was presented at block 300 and the time the player reacted to it at block 302 is excessive, e.g., by exceeding a threshold period. If not, the logic may end at state 310 without changing any outcome of the game, e.g., by indicating that the player (who recall was determined to have input the correct response) killed the monster.

In contrast, in the case in which it is identified that the player's reaction time was both excessive (at decision diamond 308) and correct (at decision diamond 304), the logic may alter the game outcome at block 312. More particularly, a player who correctly inputs a response to the event presented at block 300 but is slow in doing so can be relieved of penalty for a slowness that the player might not be able to help by altering the game path. Note that the steps in FIG. 3 may be exchanged, e.g., decision diamond 308 may occur before decision diamond 304.

Figure 4:
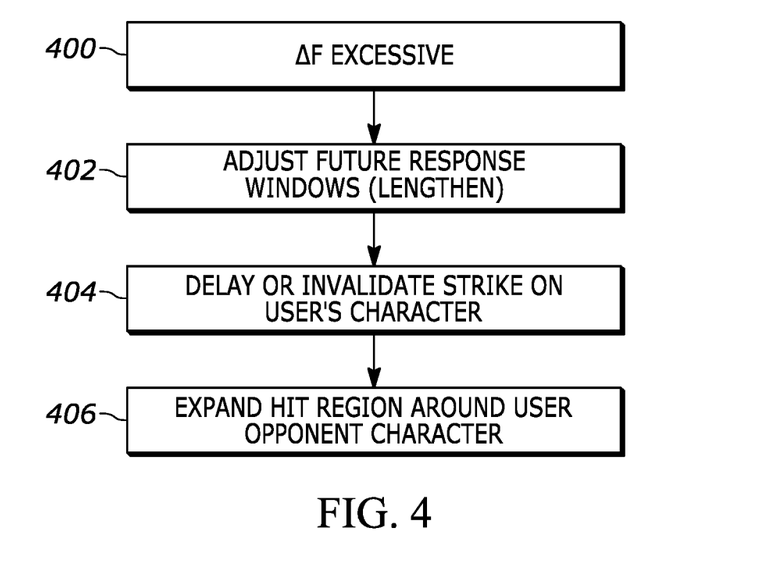
FIG. 4 illustrates example adjustment logic in example flow chart format.

FIG. 4 illustrates further. When the response time of the player is excessive at block 400 of FIG. 4 (but the response was correct), at block 402 a response window for future events may be increased to allow the player more time to choose an action in response to an in-simulation event. In addition, or alternatively, at block 404 the outcome of the game can be changed by delaying an event affecting a simulation character such as damage to a simulation character associated with the player, and/or by invalidating an event affecting a simulation character such as damage to a simulation character associated with the player. Yet again, at block 406 the outcome can be changed by expanding a hit region around a simulation character from a first region outside of which a hit is not registered to a second region outside of which a hit is not registered, in which the second region is larger than the first region and a hit is registered inside the second region.

Figure 5:
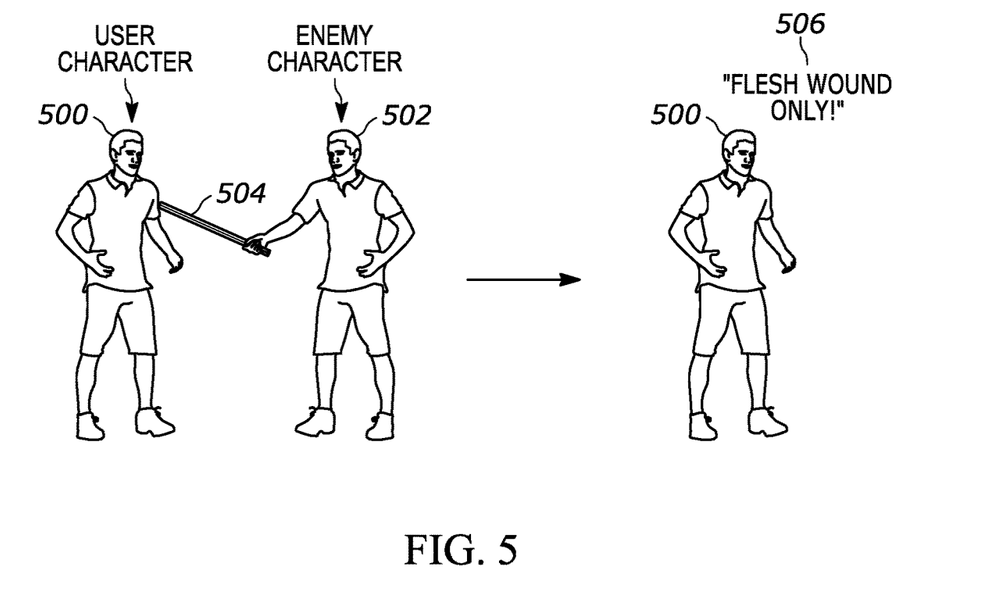
FIG. 5 schematically illustrates adjusting or invalidating a strike against the user's character.
Figure 6:
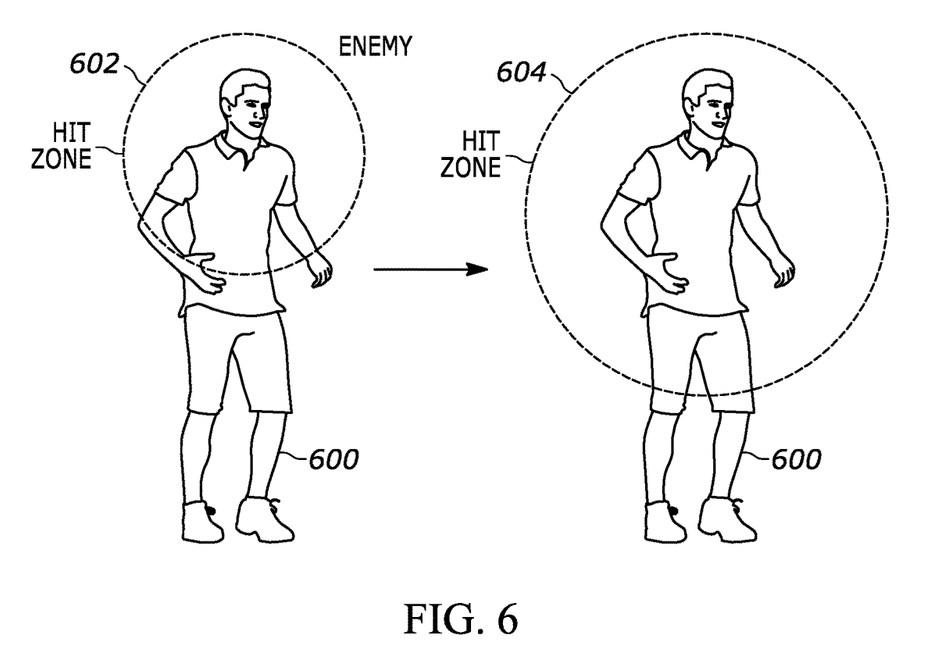
FIG. 6 schematically illustrates expanding a hit zone around an enemy character.

FIG. 5 illustrates principles of block 404 in FIG. 4 while FIG. 6 illustrates principles of block 406 in FIG. 4.

As shown in FIG. 5, a game character 500 associated with the player or user is being attacked in the computer simulation by an adversary character 502 wielding a weapon 504. The player may have reacted correctly but too late to deflect the attack, in which case the game is altered from the player character 500 dying or being severely incapacitated to being afflicted with a lesser injury, such as a flesh wound as indicated at 506.

In FIG. 6, an enemy character 600 in the simulation may be emulated as being killed or severely wounded if the player successfully attacks the character 600 within a relatively small hit zone 602. The player may have reacted correctly but too late or too inaccurately to implement the attack within the hit zone 602, in which case the game is altered by, for future events or for the present event, enlarging the hit zone to the larger size 604 shown in FIG. 6.

The controller 202 in FIG. 2 can have a variable difficulty setting that communicates with the simulation to alter game state. Essentially, the player intent and decision being made is identified (such as by detecting a muscle spasm using the biometric sensor 208, or eye tracking using the camera 212, etc.) and the game selectively altered accordingly. The computer simulation may or may not be a virtual reality (VR) simulation presented on the HMD 46 in FIG. 1. Player attention may also be identified using game data, such as by knowing aim reticle/tracking enemy at same rate. Indicating that the player is clearly looking at the enemy. A magnet to force the player to move a control on the controller 202 may be provided to force the player in the right direction. Force feedback may be used such as to stiffen the trigger if the correct response is "don't shoot" or soften the trigger if the correct response is "shoot".

Finger tracking on controller may be used prior to button push or joystick move to track the pose of the player's hand in real-time as an indication of correctness of reaction or response. A see-through camera and/or capacitive sensor may be used for this purpose. The system can transparently learn what the player's reaction time is, make it part of the player's profile, and then scale the handicap that future games accord the player based on that. The player may be matched with other people of similar response times for online gaming. The handicap might vary based on time of day to account for the player being more alert in morning and hence reaction time is better. The handicap can also vary based on length of time play was conducted since the player might fatigue after playing for a while. Present principles may also be used to train the players by indicating correct locations and responses the player's character should assume.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   receive from a sensor at least one indication of attention of a player of a computer simulation;
   identify at least in part a timing gap based at least in part on the indication;
   identify whether an input received from the player is a correct input; and
   responsive to identifying that the input is correct and based at least in part on the timing gap, change an outcome of the computer simulation from a first outcome to a second outcome, wherein the instructions are executable to change the outcome at least in part any one or more of:
   delaying an event affecting a simulation character associated with the player;
   invalidating an event affecting a simulation character associated with the player;
   expanding a hit region around a simulation character from a first region outside of which a hit is not registered to a second region outside of which a hit is not registered, the second region being larger than the first region and a hit being registered inside the second region.

2. The device of claim 1, wherein the sensor comprises at least one camera.

3. The device of claim 1, wherein the sensor comprises at least one motion sensor.

4. The device of claim 1, wherein the sensor comprises at least one electromyography (EMG) sensor.

5. The device of claim 1, wherein the instructions are executable to change the outcome at least in part by altering a response window to allow the player more time to choose an action in response to an in-simulation event.

6. The device of claim 1, wherein the instructions are executable to change the outcome at least in part by delaying an event affecting a simulation character associated with the player.

7. The device of claim 1, wherein the instructions are executable to change the outcome at least in part by invalidating an event affecting a simulation character associated with the player.

8. The device of claim 1, wherein the instructions are executable to change the outcome at least in part by expanding a hit region around a simulation character from a first region outside of which a hit is not registered to a second region outside of which a hit is not registered, the second region being larger than the first region and a hit being registered inside the second region.

9. The device of claim 1, comprising the at least one processor.

10. The device of claim 1, wherein the sensor is supported by a computer game headset wearable by the player.

11. The device of claim 1, wherein the sensor is supported by a computer game console.

12. An apparatus comprising:
    at least one processor configured with instructions for:
    identifying whether a reaction time of a player of a computer simulation to an event in the computer simulation exceeds a period;
    identifying whether an action of the player is correct;
    responsive to identifying that the action of the player is correct, and that the reaction time exceeds the period, altering an outcome of the computer simulation;

responsive to identifying that the action of the player is not correct, and that the reaction time exceeds the period, not altering an outcome of the computer simulation; and responsive to identifying that the action of the player is correct, and that the reaction time does not exceed the period, not altering an outcome of the computer simulation.

13. The apparatus of claim 12, wherein identifying whether a reaction time of a player of a computer simulation to an event in the computer simulation exceeds a period is based at least in part on signals from at least one sensor.

14. The apparatus of claim 13, wherein the sensor comprises at least one camera.

15. The apparatus of claim 13, wherein the sensor comprises at least one motion sensor.

16. The apparatus of claim 13, wherein the sensor comprises at least one electromyography (EMG) sensor.

17. The apparatus of claim 12, wherein the instructions are executable for altering the outcome at least in part by altering a response window to allow the player more time to choose an action in response to an in-simulation event.

18. The apparatus of claim 12, wherein the instructions are executable for altering the outcome at least in part by altering damage to a simulation character associated with the player.

19. The apparatus of claim 12, wherein the instructions are executable for altering the outcome at least in part by expanding a hit region around a simulation character from a first region outside of which a hit is not registered to a second region outside of which a hit is not registered, the second region being larger than the first region and a hit being registered inside the second region.

20. A method comprising:

altering an outcome of a computer game responsive to a correct user input and a reaction time delay having a first length;

not altering an outcome of the computer game responsive to an incorrect user input and a reaction time delay having the first length; and not altering an outcome of the computer game responsive to a correct user input and a reaction time delay having a second length shorter than the first length.

* * * * *